United States Patent
Kamei et al.

(10) Patent No.: US 12,264,937 B2
(45) Date of Patent: Apr. 1, 2025

(54) GUIDE DISPLAY SYSTEM, GUIDE DISPLAY METHOD, GUIDE DISPLAY APPARATUS, AND COMPUTER READABLE RECORDING MEDIUM

(71) Applicant: NEC Corporation, Tokyo (JP)

(72) Inventors: Akira Kamei, Tokyo (JP); Masato Kitada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 19 days.

(21) Appl. No.: 17/781,471

(22) PCT Filed: Dec. 20, 2019

(86) PCT No.: PCT/JP2019/050156
§ 371 (c)(1),
(2) Date: Jun. 1, 2022

(87) PCT Pub. No.: WO2021/124566
PCT Pub. Date: Jun. 24, 2021

(65) Prior Publication Data
US 2023/0058354 A1    Feb. 23, 2023

(51) Int. Cl.
*G01C 21/00*   (2006.01)
*G06Q 10/02*   (2012.01)
*G06V 40/00*   (2022.01)

(52) U.S. Cl.
CPC ......... *G01C 21/3844* (2020.08); *G06Q 10/02* (2013.01); *G06V 40/00* (2022.01)

(58) Field of Classification Search
None
See application file for complete search history.

(56) References Cited

U.S. PATENT DOCUMENTS

2008/0046298 A1*  2/2008  Ben-Yehuda ........ G06Q 10/109
                                                        705/6
2011/0237184 A1*  9/2011  Minoshima ...... G08G 1/096883
                                                        455/39

(Continued)

FOREIGN PATENT DOCUMENTS

JP    2000-020548 A    1/2000
JP    2005-201801 A    7/2005
(Continued)

OTHER PUBLICATIONS

English translation of Written opinion for PCT Application No. PCT/JP2019/050156, mailed on Jun. 30, 2020.
(Continued)

*Primary Examiner* — Truc M Do

(57) ABSTRACT

A guide display system includes: a user terminal; a checkpoint terminal; and a server, in which the server includes: a specifying unit that uses biometric information obtained from the checkpoint terminal to specify person identification information for identifying a user associated with the biometric information; an obtaining unit that obtains date and time information indicating a date and time when the user passed through a checkpoint; a selection unit that selects, based on the obtained date and time information, one or more destinations from destination information indicating a plurality of destinations that are registered in association with the specified person identification information and are the destinations of the user; and a display information generation unit that generates display information for displaying the guide display corresponding to the one or more selected destination on the user terminal.

12 Claims, 7 Drawing Sheets

(56) References Cited

U.S. PATENT DOCUMENTS

| | | | |
|---|---|---|---|
| 2014/0209674 A1* | 7/2014 | Borucki | G06K 1/00 235/382 |
| 2015/0220606 A1* | 8/2015 | Ito | G06F 16/248 707/722 |
| 2016/0247098 A1* | 8/2016 | Bongiorno | G06Q 10/025 |
| 2019/0012451 A1* | 1/2019 | Cornick | G07C 9/26 |
| 2019/0228492 A1* | 7/2019 | Mizutani | G06T 7/60 |

FOREIGN PATENT DOCUMENTS

| | | |
|---|---|---|
| JP | 2013-130544 A | 7/2013 |
| JP | 2018-049336 A | 3/2018 |
| JP | 2019-138913 A | 8/2019 |

OTHER PUBLICATIONS

JP Office Action for JP Application No. 2021-565301, mailed on Apr. 25, 2023 with English Translation.
International Search Report for PCT Application No. PCT/JP2019/050156, mailed on Mar. 3, 2020.

\* cited by examiner

Fig. 3

| BIOMETRIC INFORMATION | REGISTRATION INFORMATION | | | | | | | | | |
|---|---|---|---|---|---|---|---|---|---|---|
| | PERSON IDENTIFICATION INFORMATION | CHECKPOINT INFORMATION | | ... | RESERVATION INFORMATION | | | | | |
| | | DATE AND TIME INFORMATION | LOCATION INFORMATION | | DESTINATION 1 | | | DESTINATION 2 | | |
| | | | | | DESTINATION INFORMATION | DESTINATION DATE AND TIME INFORMATION | DESTINATION LOCATION INFORMATION | DESTINATION INFORMATION | DESTINATION DATE AND TIME INFORMATION | DESTINATION LOCATION INFORMATION |
| BD1 | 000001 | YMDT01 | AP00001 | ... | Hotel01 | YMDT11 | P0011 | TS00003 | YMDT21 | P0021 | ... |
| BD2 | 000002 | YMDT02 | AP00002 | ... | Hotel02 | YMDT12 | P0012 | TS00004 | YMDT22 | P0022 | ... |
| BD3 | 000003 | YMDT03 | AP00003 | ... | TS0001 | YMDT13 | P0013 | TS00005 | YMDT23 | P0023 | ... |
| BD4 | 000004 | YMDT04 | AP00004 | ... | TS0002 | YMDT14 | P0014 | TS00006 | YMDT24 | P0024 | ... |
| ... | ... | ... | ... | ... | ... | ... | ... | ... | ... | ... |

Fig. 4

| BIOMETRIC INFORMATION | REGISTRATION INFORMATION |||||||||||
|---|---|---|---|---|---|---|---|---|---|---|---|
| | PERSON IDENTIFICATION INFORMATION | CHECKPOINT INFORMATION ||| ... | RESERVATION INFORMATION |||||||
| | | | | | | DESTINATION 1 |||| DESTINATION 2 |||
| | | DATE AND TIME INFORMATION | LOCATION INFORMATION | ... | | DESTINATION INFORMATION | DESTINATION DATE AND TIME INFORMATION | DESTINATION LOCATION INFORMATION | PRIORITY | DESTINATION INFORMATION | DESTINATION DATE AND TIME INFORMATION | DESTINATION LOCATION INFORMATION | PRIORITY | ... |
| BD1 | 000001 | YMDT01 | AP00001 | ... | | Hotel01 | YMDT11 | P0011 | 1 | TS00003 | YMDT21 | P0021 | 2 | ... |
| BD2 | 000002 | YMDT02 | AP00002 | ... | | Hotel02 | YMDT12 | P0012 | 2 | TS00004 | YMDT22 | P0022 | 1 | ... |
| BD3 | 000003 | YMDT03 | AP00003 | ... | | TS0001 | YMDT13 | P0013 | 1 | TS00005 | YMDT23 | P0023 | 2 | ... |
| BD4 | 000004 | YMDT04 | AP00004 | ... | | TS0002 | YMDT14 | P0014 | 3 | TS00006 | YMDT24 | P0024 | 2 | ... |
| ... | ... | ... | ... | ... | | ... | ... | ... | ... | ... | ... | ... | ... | ... |

Fig.5

GUIDE LIST

|  | PRIORITY | DESTINATION INFORMATION | DESTINATION DATE AND TIME INFORMATION | DESTINATION LOCATION INFORMATION | |
|---|---|---|---|---|---|
| DESTINATION 1 | 1 | Hotel01 | YMDT11 | P0011 | — 51 |
| DESTINATION 2 | 2 | TS00003 | YMDT21 | P0021 | — 52 |
| ⋮ | ⋮ | ⋮ | ⋮ | ⋮ | |

GUIDE DISPLAY SYSTEM, GUIDE DISPLAY METHOD, GUIDE DISPLAY APPARATUS, AND COMPUTER READABLE RECORDING MEDIUM

This application is a National Stage Entry of PCT/JP2019/050156 filed on Dec. 20, 2019, the contents of all of which are incorporated herein by reference, in their entirety.

TECHNICAL FIELD

The technical field relates to a guide display system, a guide display method, and a guide display apparatus for displaying a guide, and further relates to a computer readable recording medium in which a program for realizing the same is recorded.

BACKGROUND ART

A technique has been proposed for displaying, on a user terminal, a guide display for guiding a user to a destination with use of the current location of a traveler and destination information for the traveler (information indicating the location of a destination: location information regarding an accommodation reserved by the traveler, a tourist spot registered in advance by the traveler, or the like).

As a related technique, Patent Document 1 discloses an information processing apparatus that presents to the user a restaurant available in a time period suitable for a meal when a mobile vehicle carrying the user moves from a departure point to a destination. According to the information processing apparatus of Patent Document 1, the position where the moving vehicle will be moving in a preset meal time is estimated, and a restaurant within a predetermined distance from the estimated position is displayed on the user terminal.

LIST OF RELATED ART DOCUMENTS

Patent Document

Patent Document 1: Japanese Patent Laid-Open Publication No. 2019-138913

SUMMARY OF INVENTION

Technical Problems

However, the information processing apparatus of Patent Document 1 is an apparatus that displays a guide display by associating a restaurant close to the moving vehicle with a route from the departure point to the destination based on the estimated current position of the moving vehicle, but is not an apparatus that displays a guide display for an accommodation reserved by traveler, a registered tourist spot, or the like.

Further, in the information processing apparatus of Patent Document 1, many operations must be performed by the user at their location before the guide display is displayed on the user terminal, which may feel troublesome to the user. Therefore, it causes a decrease in user convenience in guide display.

An example of an object of the present invention is to provide a guide display system, a guide display method, and a guide display apparatus that are for displaying a guide display and can improve user convenience in guide display, and a computer readable recording medium.

Solution to the Problems

In order to achieve the above object, a guide display system in one aspect of the present invention includes:
 a user terminal configured to display a guide display;
 a checkpoint terminal provided at a checkpoint; and
 a server configured to display the guide display on the user terminal,
 wherein the server includes:
  a specifying unit configured to specify, with use of biometric information obtained from the checkpoint terminal, person identification information for identifying a user associated with the biometric information;
  an obtaining unit configured to obtain date and time information indicating a date and time when the user passed through the checkpoint;
  a selection unit configured to select, based on the obtained date and time information, one or more destinations from destination information indicating a plurality of destinations that are registered in advance in association with the specified person identification information and are destinations of the user; and
  a display information generation unit configured to generate display information for displaying the guide display corresponding to the selected one or more destinations on the user terminal.

Further, in order to achieve the above object, a guide display method in one aspect of the present invention includes carrying out:
 specifying, with use of biometric information obtained from a checkpoint terminal provided at a checkpoint, person identification information for identifying a user associated with the biometric information;
 obtaining date and time information indicating a date and time when the user passed through the checkpoint;
 selecting, based on the obtained date and time information, one or more destinations from destination information indicating a plurality of destinations that are registered in advance in association with the specified person identification information and are destinations of the user; and
 generating display information for displaying a guide display corresponding to the one or more selected destinations on a user terminal for displaying the guide display.

Further, in order to achieve the above object, a guide display apparatus in one aspect of the present invention includes:
 a specifying unit configured to specify, with use of biometric information obtained from a checkpoint terminal provided at a checkpoint, person identification information for identifying a user associated with the biometric information;
 a date and time information obtaining unit configured to obtain date and time information indicating a date and time when the checkpoint is passed through;
 a selection unit configured to select, based on the obtained date and time information, one or more destinations from destination information indicating a plurality of destinations that are registered in advance in association with the specified person identification information and are destinations of the user; and
 a display information generation unit configured to generate display information for displaying, on a user terminal for displaying a guide display, the guide display corresponding to the one or more selected destinations.

Further, in order to achieve the above object, a computer readable recording medium in one aspect of the present invention includes a program recorded thereon, the program including instructions that cause a computer to carry out:

specifying, with use of biometric information obtained from a checkpoint terminal provided at a checkpoint, person identification information for identifying a user associated with the biometric information;

obtaining date and time information indicating a date and time when the checkpoint was passed through, from the checkpoint terminal;

selecting, based on the obtained date and time information, one or more destinations from destination information indicating a plurality of destinations that are registered in advance in association with the specified person identification information and are destinations of the user; and generating display information for displaying, on a user terminal for displaying a guide display, the guide display corresponding to the one or more selected destinations.

Advantageous Effects of the Invention

As described above, according to the present invention, it is possible to display a guide display having improved user convenience.

BRIEF DESCRIPTION OF THE DRAWINGS

FIG. 3 is a diagram for describing an example of a data structure of registration information.
FIG. 4 is a diagram for describing setting of priority.
FIG. 5 is a diagram for describing an example of a guide list.

EXAMPLE EMBODIMENT

Example Embodiment

Figure 1:
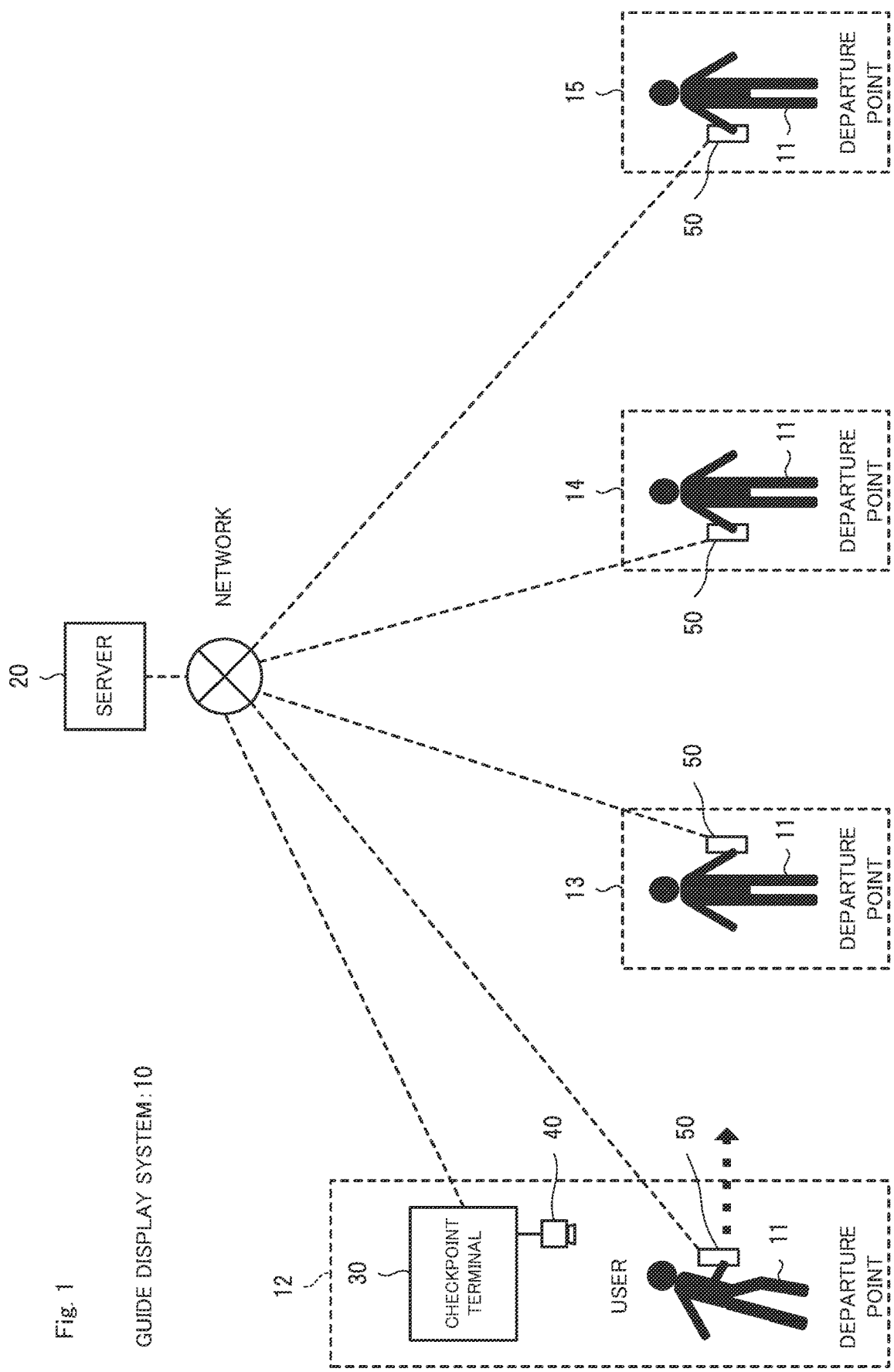
FIG. 1 is a diagram for describing an example of a system.

Hereinafter, example embodiments of the present invention will be described with reference to FIGS. 1 to 7.
[System Configuration]
A configuration of a guide display system 10 in the present example embodiment will be described with reference to FIG. 1. FIG. 1 is a diagram for describing an example of a system. FIG. 1 illustrates the configuration of the guide display system 10 and movement of a user 11 from a checkpoint 12 (departure point) to destinations 13, 14, and 15.

The checkpoint 12 indicates a place (position) where the user 11 starts moving toward the destinations 13, 14, and 15. The checkpoint 12 is a point provided in a transportation facility, an accommodation facility, a tourist spot, an event venue, or the like. If the checkpoint 12 is an airport, it can be an immigration checkpoint, a baggage checkpoint, a customs inspection point, or the like. Note that although one checkpoint 12 is illustrated in FIG. 1, a plurality of checkpoints may be provided.

The destinations 13, 14, and 15 indicate places (positions) that are destinations (positions) of the user 11 registered in advance. The destinations are each a transportation facility, an accommodation facility, a tourist spot, an event venue, or the like. The destination may be registered by the actual user 11 or, for example, by a travel agency other than the user 11. Note that the destination may be any checkpoint other than the departure point.

The guide display system 10 is a system for providing a guide display service that improves convenience for the user 11. The guide display service in the present example embodiment is a service that provides the user 11 with a guide display from the checkpoint 12 to any one of the destinations 13, 14, and 15 after the user 11 arrives at the checkpoint 12.

The guide display is a display for providing the user 11 with guidance on, for example, the name of the destination, the route and distance from the checkpoint 12 to the destination, the time required to travel from the checkpoint 12 to the destination, and destination information (information for introducing transportation facilities, accommodation facilities, tourist spots, event venues, and the like).

Further, as illustrated in FIG. 1, the guide display system 10 is a system including a server 20, a checkpoint terminal 30, an imaging terminal 40, and a user terminal 50.

The checkpoint terminal 30 is a device provided at the checkpoint 12. Further, the checkpoint terminal 30 is connected to the imaging terminal 40 provided outside the checkpoint terminal 30 in order to obtain biometric information. However, the imaging terminal 40 may be provided inside the checkpoint terminal 30.

Specifically, the checkpoint terminal 30 obtains biometric information regarding the user 11 and transmits the obtained biometric information to the server 20. The checkpoint terminal 30 can be, for example, an information processing device such as a personal computer or a mobile computer.

The biometric information is, for example, information indicating a face image of the user 11, a characteristic amount of the face image, characteristics of a biological organ (for example, a fingerprint, an iris, a vein, or the like) other than the face of the user 11, or characteristics of behavior of the user 11. In addition, two or more of these pieces of the information may be used as the biometric information.

The imaging terminal 40 is, for example, a device such as a camera. Specifically, the imaging terminal 40 outputs the captured image to the checkpoint terminal 30. Note that if face recognition is performed using the imaging terminal 40, it is preferable to install the imaging terminal 40 at a place where the face of the user 11 can be imaged when the user walks through the checkpoint 12.

The user terminal 50 is a terminal device of the user 11 for displaying a guide display. Specifically, the user terminal 50 obtains display information for displaying the guide display on the display provided in the user terminal 50 from the server 20, and displays the guide display on the user terminal 50 using the obtained display information.

Note that the display can be, for example, a device such as a liquid crystal display or an organic EL (Electro Luminescence) display with a touch panel. Further, the user terminal 50 may include an audio output device such as a speaker.

The server 20 (guide display apparatus) is a computer for providing a service for displaying the guide display to the user 11. The server 20 is, for example, an information processing apparatus such as a server computer, a personal computer, or a mobile terminal equipped with a central processing unit (CPU), a field programmable gate array (FPGA), or both of them. Further, the server 20 may be configured by using a plurality of computers.

Specifically, after the user 11 arrives at the checkpoint 12, the server 20 first uses the biometric information of the user 11 obtained from the checkpoint terminal 30, to specify person identification information for identifying the user 11 associated with the biometric information.

The person identification information is information for identifying the user 11 associated with the biometric information of the user 11, and is stored (registered) in advance in a storage device (not illustrated) provided inside the server 20 or outside the server 20.

In the example of FIG. 1, to specify the person identification information, the server 20 obtains the biometric information of the user 11 from the checkpoint terminal 30, performs biometric authentication using the obtained biometric information, and specifies the person identification information corresponding to the user 11.

Subsequently, the server 20 obtains date and time information indicating a date and time when the user 11 passes through the checkpoint 12. Note that at that time, the server 20 may obtain location information indicating the location of the checkpoint 12.

The date and time information is information associated with the specified person identification information when the user 11 is detected (passed through) at the checkpoint 12, and is stored in the storage device (not illustrated) provided inside the server 20 or outside the server 20. The date and time information can be, for example, information indicating the year, month, day, hour, minute, and second (the date and time) when the user 11 is detected to be at the checkpoint 12.

When the user 11 is detected at the checkpoint 12, the location information is associated with the specified person identification information and stored in the storage device. The location information can be, for example, information indicating the location of the checkpoint terminal 30.

Subsequently, the server 20 selects any one of the destinations based on the date and time information obtained from destination information indicating the destinations 13, 14, and 15 that are registered in advance in association with the specified person identification information and are destinations of the user 11. Thereafter, the server 20 uses the selected destination information to generate display information for displaying the guide display on the user terminal 50, and transmits the display information to the user terminal 50.

For example, if the checkpoint 12 is an immigration checkpoint, a baggage checkpoint, a customs inspection point, or the like provided at an airport, and the date and time when the user 11 is detected at the checkpoint 12 is in the evening or nighttime, there is a high possibility that the user 11 will not go sightseeing that day, and thus the server 20 selects the accommodation facility where the user 11 will stay on that day, and displays the guide display from the checkpoint 12 to the accommodation facility, on the user terminal 50.

Further, if the date and time when the user 11 is detected at the checkpoint 12 is in the morning or daytime, there is time before checking in at the accommodation facility where user 11 will stay that day, and thus the server 20 selects a tourist spot registered as a destination for that day, and displays the guide display from the checkpoint 12 to the tourist spot on the user terminal 50.

As described above, in the present example embodiment, any one of the destinations 13, 14, and 15 is automatically selected according to the date and time when the checkpoint 12 is passed through, and the guide display from the checkpoint 12 to the selected destination is displayed on the user terminal 50. Thus, it is possible for only the guide display from the checkpoint 12 to the selected destination to be displayed without the user 11 operating the user terminal 50, and thus convenience for the user 11 in the guide display is improved.

For example, when heading from an airport to a destination, conventionally, the user 11 must, while at the airport, directly enter the airport name as the departure point, the destination name as the destination, and the like on an input display for inputting the departure point and the destination displayed on the user terminal 50.

Further, if there are other destinations, the same operation must be performed for the other destinations. Further, with the above-mentioned operations, the user 11 can find out the route, the arrival date and time, and the like for each destination, but further operations are required for the user 11 to know whether the destination can actually be reached. Therefore, convenience for the user 11 in the guide display is not good.

However, in the present example embodiment, simply by the user 11 passing through the checkpoint 12 provided at the airport, the destination where the user 11 can actually go that day is selected, and only the guide display corresponding to the selected destination is displayed on the user terminal 50. Therefore, the guide display can be smoothly presented to the user 11 without bothering the user 11.

[Server Configuration]

Figure 2:
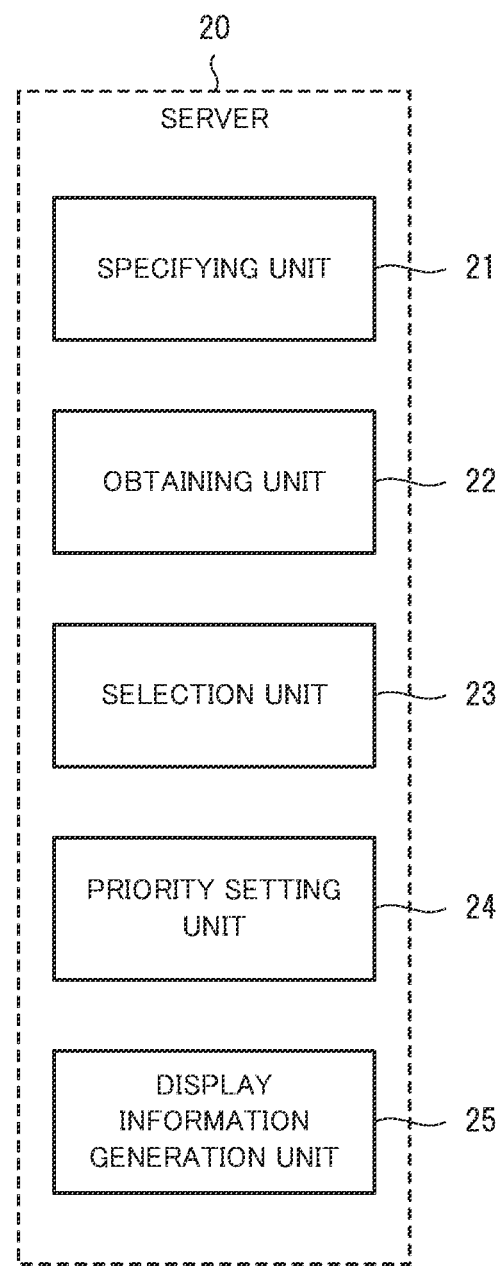
FIG. 2 is a diagram for describing an example of a server.

Subsequently, the configuration of the server 20 in the present example embodiment will be described more specifically with reference to FIG. 2. FIG. 2 is a diagram for describing an example of the server. As illustrated in FIG. 2, the server 20 in the present example embodiment includes a specifying unit 21, an obtaining unit 22, a selection unit 23, a priority setting unit 24, and a display information generation unit 25.

The specifying unit 21 specifies the person identification information associated with the biometric information by using the biometric information obtained from the checkpoint terminal 30. Specifically, the specifying unit 21 first obtains the biometric information of the user 11 from the checkpoint terminal 30. Subsequently, the specifying unit 21 refers to registration information registered in advance by using the obtained biometric information, and specifies the biometric information similar to the obtained biometric information.

Subsequently, the specifying unit 21 refers to the pre-registered registration information using the specified biometric information, and identifies the person identification information associated with the biometric information. Subsequently, the specific unit 21 outputs the person identification information to the obtaining unit 22 and the selection unit 23.

The registration information will be described below. FIG. 3 is a diagram for describing an example of a data structure of the registration information. In the registered information illustrated in FIG. 3, the person identification information and the information related to the user are associated with the biometric information for each user. "BD1" to "BD4" . . . described in "biological information" in FIG. 3 indicate biometric information registered in advance by the user. "000001" to "000004" . . . described in "person identification information" are information for identifying the user 11, and are associated with the biometric information.

Further, for example as illustrated in FIG. 3, the person identification information is associated with checkpoint information (date and time information, location information) indicating that the user 11 has passed through the checkpoint 12 and reservation information (destination information, destination location information, destination date and time information for each destination) registered in advance. Note that the person identification information may be further registered in association with information related to the user such as user's passport information and airline ticket information. The reservation information will be described later.

The obtaining unit 22 obtains the date and time information indicating the date and time when the checkpoint 12 is passed through. Specifically, the obtaining unit 22 first obtains the date and time when the user 11 is identified by the biometric authentication, as the date and time information. Further, when the user 11 is identified by the biometric authentication, the obtaining unit 22 may obtain the information indicating the location of the checkpoint terminal 30 from the checkpoint terminal 30 as the location information. Subsequently, the obtaining unit 22 stores the date and time information and the location information in association with the person identification information. Thereafter, the obtaining unit 22 outputs the date and time information to the selection unit 23.

The selection unit 23 selects any one of the pieces of destination information from the pieces of destination information indicating the destinations that are associated with the specified person identification information and are registered in advance, based on the obtained date and time information. Specifically, the selection unit 23 first selects the reservation information related to the person identification information. Subsequently, the selection unit 23 refers to the pieces of destination information using the date and time information, and selects any one of the pieces of destination information from the pieces of destination information. Thereafter, the selection unit 23 outputs the selected destination information to the priority setting unit 24.

The reservation information is information registered in advance, and the destination information, the destination location information, and the destination date and time information are associated with the person identification information, and are stored in the storage device (not illustrated) provided inside the server 20 or outside the server 20.

The destination information is, for example, information registered in advance for identifying the destinations 13, 14, and 15, and can be, for example, information indicating names of the destinations 13, 14, and 15.

The destination date and time information includes, for example, scheduled arrival date and time information indicating a scheduled date and time of arrival at the destinations 13, 14, and 15 or scheduled departure date and time information indicating a scheduled date and time of departure from destinations 13, 14, and 15, or both of them. For example, if the destination is an accommodation facility, the scheduled arrival date and time are a check-in date and time, and the scheduled departure date and time are a check-out date and time. If the destination is an event, the scheduled arrival date and time are an event start date and time, and the scheduled departure date and time are an event end date and time. When getting on and off an airplane, train, bus, or the like, the scheduled arrival date and time are a date and time to get on, and the scheduled departure date and time are a date and time to get off The destination location information can be, for example, information indicating addresses of the destinations 13, 14 and 15 registered in advance, or information indicating the longitude and latitude of the destinations 13, 14 and 15, or both of them. Further, the destination location information may be directly registered by the user 11, or may be automatically registered by the server 20 by searching the Internet based on the destination information.

Methods of selecting a destination in the case where the checkpoint 12 is an airport will be described in sections (1) to (3) below.

(1) Selection by Time Period

The selection unit 23 first selects reservation information related to the specified person identification information. Subsequently, the selection unit 23 determines whether the date and time indicated by the date and time information is in a morning/afternoon time period indicating the period from morning to afternoon set in advance. Here, the morning/afternoon time period will be, for example, from 6:00 am to 3:00 pm. If it is determined that the date and time information is in the morning/afternoon time period, the user 11 arrives at the checkpoint 12 in the morning or afternoon, and thus the selection unit 23 selects the destination information indicating the tourist spot.

On the other hand, if it is determined that the date and time indicated by the date and time information is in an evening/night time period indicating the period from evening to night, the user 11 arrives at the checkpoint 12 in the evening or night, and thus the selection unit 23 selects the destination information indicating an accommodation facility. The evening/night time period is, for example, from 3:00 pm to before 6:00 am the next day. However, the time period setting is not limited to the above-mentioned time periods.

(2) Selection Using Time Period and Destination Date and Time Information

If the scheduled date and time to go to the destination is in the evening/night time period, the above method (1) cannot be used, and thus a method (2) is proposed.

The selection unit 23 first selects reservation information related to the specified person identification information. Subsequently, the selection unit 23 determines whether the date and time indicated by the date and time information is in the morning/afternoon time period. If it is determined that the date and time information is in the morning/afternoon time period, the destination date and time information is further referred to, and destination information for which the scheduled arrival date and time is not in the morning/afternoon time period is selected. Thus, if the date and time of arrival at the checkpoint 12 is in the morning/afternoon time period, it is possible not to select a destination scheduled for arrival in the evening/night time period.

(3) Selection Using Time Period and Destination Location Information

For example, if the user 11 arrives late at the checkpoint 12, there may be a destination that cannot be reached from the checkpoint 12 that day depending on the distance from the checkpoint 12 to that destination, and thus a method (3) is proposed.

The selection unit 23 first selects reservation information related to the specified person identification information. Subsequently, the selection unit 23 calculates the distance from the checkpoint 12 to the destination using location information of the checkpoint 12 and the destination location information, and selects destination information corresponding to a destination to which the user 11 can travel based on the calculated distance. Thereafter, the selection unit 23 determines whether the date and time indicated by the date and time information is in the morning/afternoon time period or in the evening/night time period, and selects a scheduled destination for the user 11.

The priority setting unit 24 sets priorities for the pieces of destination information selected by the selection unit 23. Specifically, the priority setting unit 24 first obtains the destination information that is selected and output by the selection unit 23. Subsequently, the priority setting unit 24 determines a priority level for each piece of destination information based on the scheduled arrival date and time of each of the destinations 13, 14 and 15, or the distance from the checkpoint 12 to each of the destinations 13, 14 and 15, or a combination thereof.

FIG. 4 is a diagram for describing setting of priority. As illustrated in FIG. 4, the priority setting unit 24 associates the determined priority with each of destination 1, destination 2, . . . associated with each piece of person identification information.

Subsequently, the priority setting unit 24 outputs the selected destination information and the information indicating the priority corresponding to the selected destination information to the display information generation unit 25.

The display information generation unit 25 generates the display information for displaying the guide display corresponding to the selected destination on the user terminal 50. Specifically, the display information generation unit 25 first obtains the selected destination information and the information indicating the priority corresponding to the selected destination information. Subsequently, the display information generation unit 25 collects information necessary for the guide display related to the destination information using the selected destination information, and generates the display information for displaying the guide display on the user terminal 50 using the collected information.

Thereafter, the server 20 transmits the display information to the user terminal 50. The user terminal 50 that has received the display information displays the guide display on the display of the user terminal 50 based on the display information. Note that if the specifying unit 21 specifies person identification information (if it was detected that the user 11 has passed through the checkpoint), the server 20 displays the guide display on the display of the user terminal 50. Here, the checkpoint includes not only the checkpoint 12 that is the departure point but also a checkpoint that the user 11 passes through while traveling and is different from the departure point.

Further, if multiple pieces of destination information have been selected, the display information generation unit 25 generates the display information for displaying on the user terminal 50 a guide list in which the selected pieces of destination information are arranged according to priority.

FIG. 5 is a diagram for describing an example of the guide list. In the example of the guide list in FIG. 5, the destinations and the destination-related information (the priority, the destination information, the destination date and time information, the destination location information, and the like) are displayed in order from the destination with the highest priority. However, the guide list is not limited to the example of FIG. 5. As another example, only the names of the destinations may be displayed in order. Alternatively, contrary to the example of FIG. 5, the destinations may be displayed in order from the destination with the lowest priority.

Note that when the user 11 selects a destination display 51 in the guide list displayed on the display of the user terminal 50, the guide display about the destination 1 is displayed on the display of the user terminal 50, and when the user 11 selects a destination display 52, the guide display about the destination 2 is displayed on the display of the user terminal 50.

Further, if multiple pieces of destination information have been selected, a configuration is possible in which the guide list is not displayed, and only the guide display about the destination information with the highest priority is directly displayed on the display of the user terminal 50. Further, if there is only one selected piece of destination information, the guide display about the destination information may be directly displayed on the display of the user terminal 50 without displaying the guide list.

[Apparatus Operation]

Figure 6:
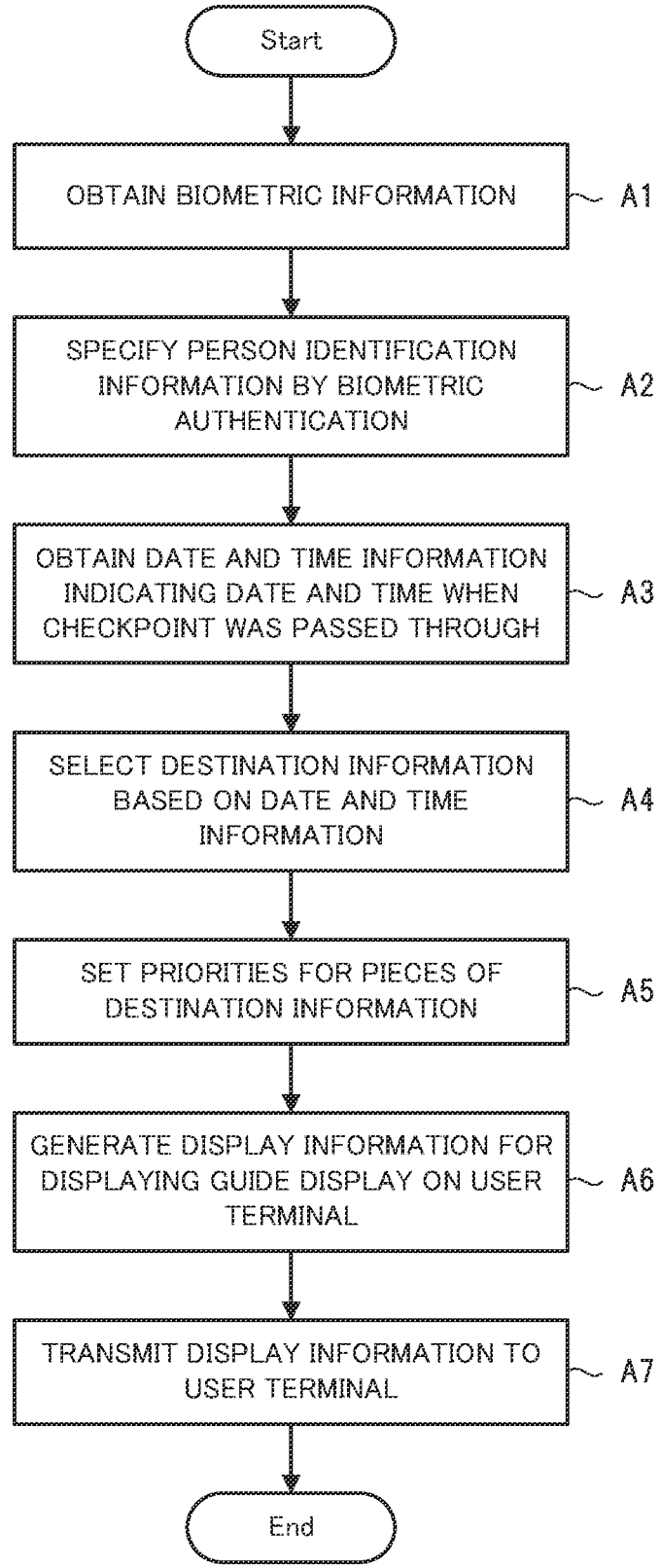
FIG. 6 is a diagram for describing an example of operation of a guide display system.

Next, an operation of the server (guide display apparatus) in an example embodiment of the present invention will be described with reference to FIG. 6. FIG. 6 is a diagram for describing an example of the operation of the guide display system. In the following description, FIGS. 1 to 5 will be referred to as appropriate. Further, in the present example embodiment, a guide display method is performed by causing the server to operate. Therefore, the description of the guide display method in the present example embodiment is replaced with the following description of the operation of the server.

As illustrated in FIG. 6, the specific unit 21 first obtains biometric information of the user 11 from the checkpoint terminal 30 (step A1). Subsequently, the specifying unit 21 specifies the person identification information associated with the biometric information using the biometric information obtained from the checkpoint terminal 30 (step A2).

Specifically, in step A2, the specifying unit 21 first uses the obtained biometric information to refer to the registration information registered in advance, and specifies biometric information similar to the obtained biometric information. Subsequently, in step A2, the specifying unit 21 uses the specified biometric information to refer to the registration information registered in advance, and specifies the person identification information associated with the biometric information. Subsequently, the specific unit 21 outputs the person identification information to the obtaining unit 22 and the selection unit 23.

Subsequently, the obtaining unit 22 obtains the date and time information indicating the date and time when the user 11 has passed through the checkpoint 12 (step A3). Specifically, in step A3, the obtaining unit 22 first obtains the date and time when the user 11 is identified by the biometric authentication, as date and time information. Subsequently, in step A3, the obtaining unit 22 stores the person identification information in association with the date and time information. Thereafter, the obtaining unit 22 outputs the date and time information to the selection unit 23.

Note that in step A3, when the user 11 is identified by the biometric authentication, the obtaining unit 22 may obtain information indicating the location of the checkpoint terminal 30 from the checkpoint terminal 30, as the location information.

Subsequently, the selection unit 23 selects any one of the pieces of destination information from the pieces of destination information indicating destinations that are associated with the specified person identification information and are registered in advance, based on the obtained date and time information (step A4). Specifically, in step A4, the selection unit 23 first selects reservation information related to the person identification information. Subsequently, in step A4, the selection unit 23 refers to the pieces of destination information using the date and time information, and selects any one of the pieces of destination information from the pieces of destination information. Thereafter, in step A4, of there is only one selected destination information, the selection unit 23 outputs the selected destination information to the display information generation unit 25. Note that if the selection unit 23 selects multiple destinations, the selection unit 23 outputs the selected pieces of destination information to the priority setting unit 24.

Subsequently, the priority setting unit 24 sets the priority for the pieces of destination information selected by the selection unit 23 (step A5). Specifically, in step A5, the priority setting unit 24 first obtains the destination information that was selected and output by the selection unit 23. Subsequently, in step A5, the priority setting unit 24 determines the priority for each piece of destination information based on the scheduled arrival date and time of each of the destinations 13, 14 and 15, or the distance from the checkpoint 12 to each of the destinations 13, 14 and 15, or a combination thereof.

Subsequently, in step A5, as illustrated in FIG. 4, the priority setting unit 24 associates the determined priority with each of the destination 1, the destination 2, . . . associated with each piece of person identification information. Subsequently, in step A5, the priority setting unit 24 outputs the selected destination information and the information indicating the priority corresponding to the selected destination information to the display information generation unit 25.

The display information generation unit 25 generates display information for displaying the guide display corresponding to the selected destination on the user terminal 50 (step A6). Specifically, in step A6, the display information generation unit 25 first obtains the selected destination information and the information indicating the priority corresponding to the selected destination information. Subsequently, in step A6, the display information generation unit 25 obtains the information necessary for the guide display related to the destination information using the selected destination information, and generates the display information for displaying the guide display on the user terminal 50 using the obtained information.

Thereafter, the server 20 transmits the display information to the user terminal 50 (step A7). The user terminal 50 that has received the display information displays the guide display on the display of the user terminal 50 based on the display information. Note that when the specifying unit 21 specifies the person identification information (when it was detected that the user 11 has passed through the checkpoint), the server 20 displays the guide display on the display of the user terminal 50. Here, the checkpoint includes not only the checkpoint 12 that is the departure point but also a checkpoint that the user 11 passes through while traveling and is different from the departure point.

In the example of the guide list in FIG. 5, the destinations and the information related to the destinations (the priority, the destination information, the destination date and time information, the destination location information, and the like) are displayed in order from the destination with the highest priority. However, the guide list is not limited to the example of FIG. 5. As another example, only the names of the destinations may be displayed in order.

Alternatively, contrary to the example of FIG. 5, the destinations may be displayed in order from the destination with the lowest priority.

Note that when the user 11 selects the destination display 51 in the guide list displayed on the display of the user terminal 50, the display information on the destination 1 is obtained from the server 20, and the guide display about the destination 1 is displayed on the display of the user terminal 50. Further, when the user 11 selects the destination display 52, the display information on the destination 2 is obtained from the server 20, and the guide display about the destination 2 is displayed on the display of the user terminal 50.

Further, multiple pieces of destination information were selected, a configuration is possible in which the guide list is not displayed, and only the guide display about the destination information with the highest priority is directly displayed on the display of the user terminal 50. Further, if there is only one selected piece of destination information, the guide display about the destination information may be directly displayed on the display of the user terminal 50 without displaying the guide list.

Effects of Embodiment

As described above, according to the present example embodiment, any one of the destinations 13, 14, and 15 is automatically selected according to the date and time when the checkpoint 12 is passed through, and the guide display from the checkpoint 12 to the selected destination is displayed on the user terminal 50. Thus, it is possible for only the guide display from the checkpoint 12 to the selected destination to be displayed without the user 11 operating the user terminal 50, and thus convenience for the user 11 in the guide display is improved.

For example, when heading from an airport to a destination, conventionally, the user 11 must, while at the airport, directly enter the airport name as the departure point, the destination name as the destination, and the like on the input display for inputting the departure point and the destination displayed on the user terminal 50.

Further, if there are other destinations, the same operation must be performed for the other destinations. Further, with the above-mentioned operation, the user 11 can find out the route, the arrival date and time, and the like for each destination, but further operations are required for the user 11 to know whether the destination can actually be reached. Therefore, convenience for the user 11 in the guide display is not good.

However, in the present example embodiment, simply by the user 11 passing through the checkpoint 12 provided at the airport, the destination where the user 11 can actually go on the day is selected, and only the guide display corresponding to the selected destination is displayed on the user terminal 50. Therefore, the guide display can be smoothly presented to the user 11 without bothering the user 11.

[Program]

A program in another example embodiment of the present invention may be any program that causes a computer to execute steps A1 to A7 illustrated in FIG. 6. By installing and executing the program on the computer, the server (guide display apparatus) and the guide display method in the present example embodiment can be implemented. In this case, a processor of the computer functions as the specifying unit 21, the obtaining unit 22, the selection unit 23, the priority setting unit 24, and the display information generation unit 25, and performs processing.

Further, the program in the present example embodiment may be executed by a computer system constructed by a plurality of computers. In this case, for example, each computer may function as any one of the specifying unit 21, the obtaining unit 22, the selection unit 23, the priority setting unit 24, and the display information generation unit 25.

[Physical Configuration]

Figure 7:
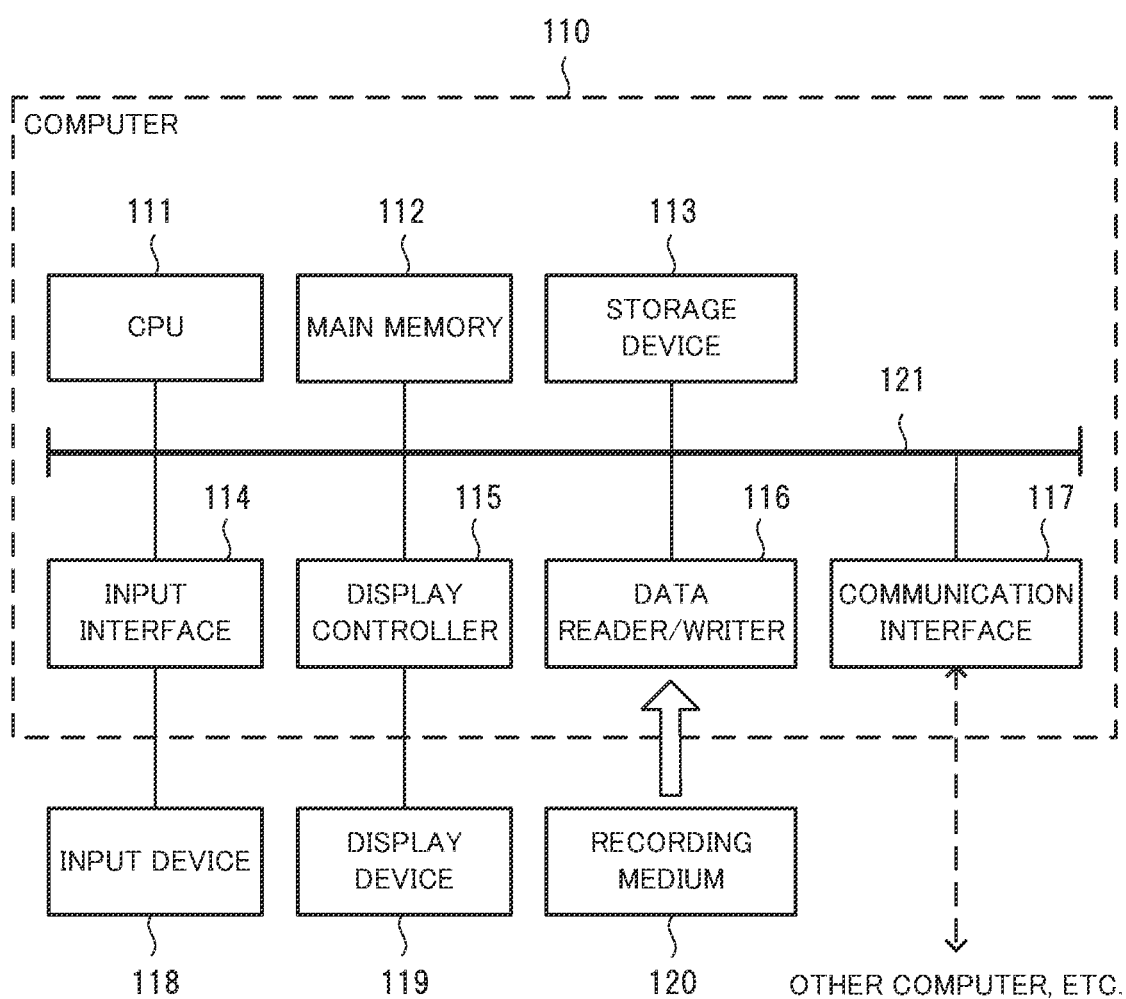
FIG. 7 is a diagram for describing an example of a computer for realizing a guide display apparatus.

Here, a computer for implementing the guide display apparatus by executing the program in an example embodiment will be described with reference to FIG. 7. FIG. 7 is a diagram for describing an example of the computer for implementing the guide display apparatus in an example embodiment of the present invention.

As illustrated in FIG. 7, a computer 110 includes a central processing unit (CPU) 111, a main memory 112, a storage device 113, an input interface 114, a display controller 115, a data reader/writer 116, and a communication interface 117. These parts are connected to each other via a bus 121 so as to be capable of data communication. Note that the computer 110 may include a graphics processing unit (GPU) or an FPGA in addition to the CPU 111 or in place of the CPU 111.

The CPU 111 expands the program (code) in the present example embodiment stored in the storage device 113 into the main memory 112 and executes the program in a predetermined order to perform various operations. The main memory 112 is typically a volatile storage device such as a dynamic random access memory (DRAM). Further, the program in the present example embodiment is provided in a state of being stored in a computer-readable recording medium 120. The program in the present example embodiment may be distributed on the Internet connected via the communication interface 117. Note that the recording medium 120 is a non-volatile recording medium.

Further, examples of the storage device 113 include a semiconductor storage device such as a flash memory in addition to a hard disk drive. The input interface 114 mediates data transmission between the CPU 111 and an input device 118 such as a keyboard and a mouse. The display controller 115 is connected to a display device 119 and controls display on the display device 119.

The data reader/writer 116 mediates the data transmission between the CPU 111 and the recording medium 120, reads the program from the recording medium 120, and writes a processing result in the computer 110 to the recording medium 120. The communication interface 117 mediates the data transmission between the CPU 111 and another computer.

Further, examples of the recording medium 120 include a general-purpose semiconductor storage device such as a compact flash (CF) (registered trademark) and a secure digital (SD), a magnetic recording medium such as a flexible disk, or an optical recording medium such as a compact disk read only memory (CD-ROM).

Note that the guide display apparatus 20 in the present example embodiment can also be implemented by using hardware corresponding to each unit instead of the computer in which the program is installed. Further, the guide display apparatus 20 may be partially implemented by a program and the rest may be implemented by hardware.

SUPPLEMENTARY NOTE

Regarding the above example embodiments, the following supplementary notes will be further disclosed. The above-described example embodiments can be partially or entirely described by (Supplementary note 1) to (Supplementary note 12) described below, but are not limited to the following descriptions.

(Supplementary Note 1)

A guide display system including:
a user terminal configured to display a guide display;
a checkpoint terminal provided at a checkpoint; and
a server configured to display the guide display on the user terminal,
wherein the server includes:
a specifying unit configured to specify, with use of biometric information obtained from the checkpoint terminal, person identification information for identifying a user associated with the biometric information;
an obtaining unit configured to obtain date and time information indicating a date and time when the user passed through the checkpoint;
a selection unit configured to select, based on the obtained date and time information, one or more destinations from destination information indicating a plurality of destinations that are registered in advance in association with the specified person identification information and are destinations of the user; and
a display information generation unit configured to generate display information for displaying the guide display corresponding to the selected one or more destinations on the user terminal.

(Supplementary Note 2)

The guide display system described in supplementary note 1, wherein if the specifying unit specified the person identification information, the server displays the guide display on the user terminal.

(Supplementary Note 3)

The guide display system described in supplementary note 1 or 2, further including:
a priority setting unit configured to, if the selection unit selected a plurality of pieces of destination information, set priorities for the selected pieces of destination information,
wherein the display information generation unit generates display information for displaying on the user terminal a guide list in which the selected pieces of destination information are arranged according to the priority.

(Supplementary Note 4)

A guide display method including:
a step of specifying, with use of biometric information obtained from a checkpoint terminal provided at a checkpoint, person identification information for identifying a user associated with the biometric information;
a step of obtaining date and time information indicating a date and time when the user passed through the checkpoint;
a step of selecting, based on the obtained date and time information, one or more destinations from destination information indicating a plurality of destinations that are registered in advance in association with the specified person identification information and are destinations of the user; and a step of generating display information for displaying a guide display corresponding to the one or more selected destinations on a user terminal for displaying the guide display.

(Supplementary Note 5)

The guide display method described in supplementary note 4, further including:
a step of displaying the guide display on the user terminal if the person identification information was specified.

(Supplementary Note 6)

The guide display method described in supplementary note 4 or 5, further including:
- a step of setting, if a plurality of pieces of destination information were selected, priorities for the selected pieces of destination information; and
- a step of generating display information for displaying on the user terminal a guide list in which the selected pieces of destination information are arranged according to the priority.

(Supplementary Note 7)

A guide display apparatus including:
- a specifying unit configured to specify, with use of biometric information obtained from a checkpoint terminal provided at a checkpoint, person identification information for identifying a user associated with the biometric information;
- a date and time information obtaining unit configured to obtain date and time information indicating a date and time when the checkpoint is passed through;
- a selection unit configured to select, based on the obtained date and time information, one or more destinations from destination information indicating a plurality of destinations that are registered in advance in association with the specified person identification information and are destinations of the user; and
- a display information generation unit configured to generate display information for displaying, on a user terminal for displaying a guide display, the guide display corresponding to the one or more selected destinations.

(Supplementary Note 8)

The guide display apparatus described in supplementary note 7, wherein if the specifying unit specified the person identification information, the guide display is displayed on the user terminal.

(Supplementary Note 9)

The guide display apparatus described in supplementary note 7 or 8, further including:
- a priority setting unit configured to, if the selection unit selected a plurality of pieces of destination information, set priorities for the selected pieces of destination information,
- wherein the display information generation unit generates display information for displaying on the user terminal a guide list in which the selected pieces of destination information are arranged according to the priority.

(Supplementary Note 10)

A computer readable recording medium including a program recorded thereon, the program including instructions that cause a computer to carry out:
- a step of specifying, with use of biometric information obtained from a checkpoint terminal provided at a checkpoint, person identification information for identifying a user associated with the biometric information;
- a step of obtaining date and time information indicating a date and time when the checkpoint was passed through, from the checkpoint terminal;
- a step of selecting, based on the obtained date and time information, one or more destinations from destination information indicating a plurality of destinations that are registered in advance in association with the specified person identification information and are destinations of the user; and
- a step of generating display information for displaying, on a user terminal for displaying a guide display, the guide display corresponding to the one or more selected destinations.

(Supplementary Note 11)

The computer readable recording medium described in supplementary note 10, including the program recorded thereon, the program further including an instruction that causes the computer to carry out a step of displaying the guide display on the user terminal if the person identification information was specified.

(Supplementary Note 12)

The computer readable recording medium described in supplementary note 10 or 11, including the program recorded thereon, the program further including instructions that cause the computer to carry out:
- a step of setting, if a plurality of pieces of destination information are selected, priorities for the selected pieces of destination information; and
- a step of generating display information for displaying on the user terminal a guide list in which the selected pieces of destination information are arranged according to the priority.

Although the present invention has been described above with reference to example embodiments, the present invention is not limited to the above example embodiments. Various changes that can be understood by those skilled in the art can be made within the scope of the present invention in terms of the structure and details of the present invention.

INDUSTRIAL APPLICABILITY

As described above, according to the present invention, it is possible to secure a range in which the execution time of data processing can be estimated and to reduce the cost required for obtaining characteristic information of data processing. The present invention is useful in fields where it is necessary to estimate the execution time of data processing.

REFERENCE SIGNS LIST

10 Guide display system
11 User
12 Checkpoint
13, 14, 15 Destination
20 Server
21 Specifying unit
22 Obtaining unit
23 Selection unit
24 Priority setting unit
25 Display information generation unit
30 Checkpoint terminal
40 Imaging terminal
50 User terminal
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A guide display system comprising:
a user terminal configured to display a guide display;
a checkpoint terminal provided at a checkpoint; and
a server configured to display the guide display on the user terminal, wherein the server comprises:
a processor; and
a memory storing executable instructions that, when executed by the processor, causes the processor to perform as:
a specifying unit configured to specify, with use of biometric information obtained from the checkpoint terminal, person identification information for identifying a user associated with the biometric information;
an obtaining unit configured to obtain date and time information indicating a date and time when the user passed through the checkpoint;
a selection unit configured to select, based on the obtained date and time information, one or more pieces of destination information from a set of pre-registered destination information in association with the specified person identification information; and
a display information generation unit configured to generate display information for displaying the guide display corresponding to the selected one or more pieces of destination information on the user terminal owned by the identified user associated with the biometric information,
wherein the selection unit is configured to further:
select reservation information including the one or more pieces of destination information and the date and time information related to the specified person identification information when the checkpoint is a transportation facility;
select the one or pieces of destination information indicating a tourist spot from the set of pre-registered destination information in association with the specified person identification information when the obtained date and time information indicates a morning afternoon time period; and
select the one or more pieces of destination information indicating an accommodation facility from the set of pre-registered destination information in association with the specified person identification information when the obtained date and time information indicates an evening night time period.

2. The guide display system according to claim 1, wherein the instructions, when executed by the processor, further cause the processor to perform as:
a priority setting unit configured to, if the selection unit selected a plurality of pieces of destination information, set priorities for the selected pieces of destination information based on the scheduled arrival date and time of a destination of each of the pieces of destination information, the distance from the checkpoint to the destination of each of the pieces of destination information, or a combination thereof,
wherein the display information generation unit generates display information for displaying on the user terminal a guide list in which the selected pieces of destination information are arranged according to the priority.

3. A guide display method performed by a computer and comprising:
specifying, with use of biometric information obtained from a checkpoint terminal provided at a checkpoint, person identification information for identifying a user associated with the biometric information;
obtaining date and time information indicating a date and time when the user passed through the checkpoint;
selecting, based on the obtained date and time information, one or more pieces of destination information from a set of pre-registered destination information in association with the specified person identification information; and
generating display information for displaying a guide display corresponding to the selected one or more pieces of destination information on a user terminal owned by the identified user associated with the biometric information and for displaying the guide display,
wherein the selecting includes:
selecting reservation information including the one or more pieces of destination information and the date and time information related to the specified person identification information when the checkpoint is a transportation facility;
selecting the one or pieces of destination information indicating a tourist spot from the set of pre-registered destination information in association with the specified person identification information when the obtained date and time information indicates a morning afternoon time period; and
selecting the one or more pieces of destination information indicating an accommodation facility from the set of pre-registered destination information in association with the specified person identification information when it is determined that when the obtained date and time information indicates an evening night time period.

4. The guide display method according to claim 3, further comprising:
displaying the guide display on the user terminal if the person identification information was specified.

5. The guide display method according to claim 3, further comprising:
setting, if a plurality of pieces of destination information were selected, priorities for the selected pieces of destination information; and
generating display information for displaying on the user terminal a guide list in which the selected pieces of destination information are arranged according to the priority.

6. A guide display apparatus comprising:
a processor; and
a memory storing program code executable by the processor to:
specify, with use of biometric information obtained from a checkpoint terminal provided at a checkpoint, person identification information for identifying a user associated with the biometric information;
obtain date and time information indicating a date and time when the checkpoint is passed through;
select, based on the obtained date and time information, one or more pieces of destination information from a set of pre-registered destination information in association with the specified person identification information; and
generate display information for displaying, on a user terminal owned by the identified user associated with the biometric information and for displaying a guide display, the guide display corresponding to the selected one or more pieces of destination information, wherein the selection includes:
  selecting reservation information including the one or more pieces of destination information and the date and time information related to the specified person identification information when the checkpoint is a transportation facility;
  selecting the one or pieces of destination information indicating a tourist spot from the set of pre-registered destination information in association with the specified person identification information when the obtained date and time information indicates a morning afternoon time period; and
  selecting the one or more pieces of destination information indicating an accommodation facility from the set of pre-registered destination information in association with the specified person identification information when the obtained date and time information indicates an evening night time period.

7. The guide display apparatus according to claim 6, wherein the program code executable by the processor further executes to:
  if the selection unit selected a plurality of pieces of destination information, set priorities for the selected pieces of destination information based on the scheduled arrival date and time of a destination of each of the pieces of destination information, the distance from the checkpoint to the destination of each of the pieces of destination information, or a combination thereof; and
  generate display information for displaying on the user terminal a guide list in which the selected pieces of destination information are arranged according to the priority.

8. A non-transitory computer readable recording medium storing a program executable by a computer to perform processing comprising:
  specifying, with use of biometric information obtained from a checkpoint terminal provided at a checkpoint, person identification information for identifying a user associated with the biometric information;
  obtaining date and time information indicating a date and time when the checkpoint was passed through, from the checkpoint terminal;
  selecting, based on the obtained date and time information, one or more pieces of destination information from a set of pre-registered destination information in association with the specified person identification information; and
  generating display information for displaying, on a user terminal owned by the identified user associated with the biometric information and for displaying a guide display, the guide display corresponding to the selected one or more pieces of destination information,
  wherein the selection selecting includes:
    selecting reservation information including the one or more pieces of destination information and the date and time information related to the specified person identification information when the checkpoint is a transportation facility;
    selecting the one or pieces of destination information indicating a tourist spot from the set of pre-registered destination information in association with the specified person identification information when the obtained date and time information indicates a morning afternoon time period; and
    selecting the one or more pieces of destination information indicating an accommodation facility from the set of pre-registered destination information in association with the specified person identification information when the obtained date and time information indicates an evening night time period.

9. The non-transitory computer readable recording medium according to claim 8, wherein the processing further comprises displaying the guide display on the user terminal if the person identification information was specified.

10. The non-transitory computer readable recording medium according to claim 8, wherein the processing further comprises:
  setting, if a plurality of pieces of destination information are selected, priorities for the selected pieces of destination information based on the scheduled arrival date and time of a destination of each of the pieces of destination information, the distance from the checkpoint to the destination of each of the pieces of destination information, or a combination thereof; and
  generating display information for displaying on the user terminal a guide list in which the selected pieces of destination information are arranged according to the priority.

11. The guide display system according to claim 1, wherein if the user arrives late at the checkpoint, the selection unit is configured to further:
  calculate the distance from the checkpoint to a destination of each of the pieces of destination information using location information of the checkpoint;
  select the one or more pieces of destination information corresponding to a destination to which the user can travel based on the calculated distance;
  determine whether the date and time indicated by the date and time information is in the morning/afternoon time period or in the evening/night time period; and
  select a scheduled destination to use.

12. The guide display system according to claim 1, wherein, when the date and time indicated by the date and time information indicates the morning/afternoon time period, the selection unit selects the one or more pieces of destination information for which a scheduled arrival date and time is not in the morning/afternoon time period.

* * * * *